(No Model.)
W. L. DECKER.
CRANK AND PEDAL.
No. 571,753. Patented Nov. 24, 1896.
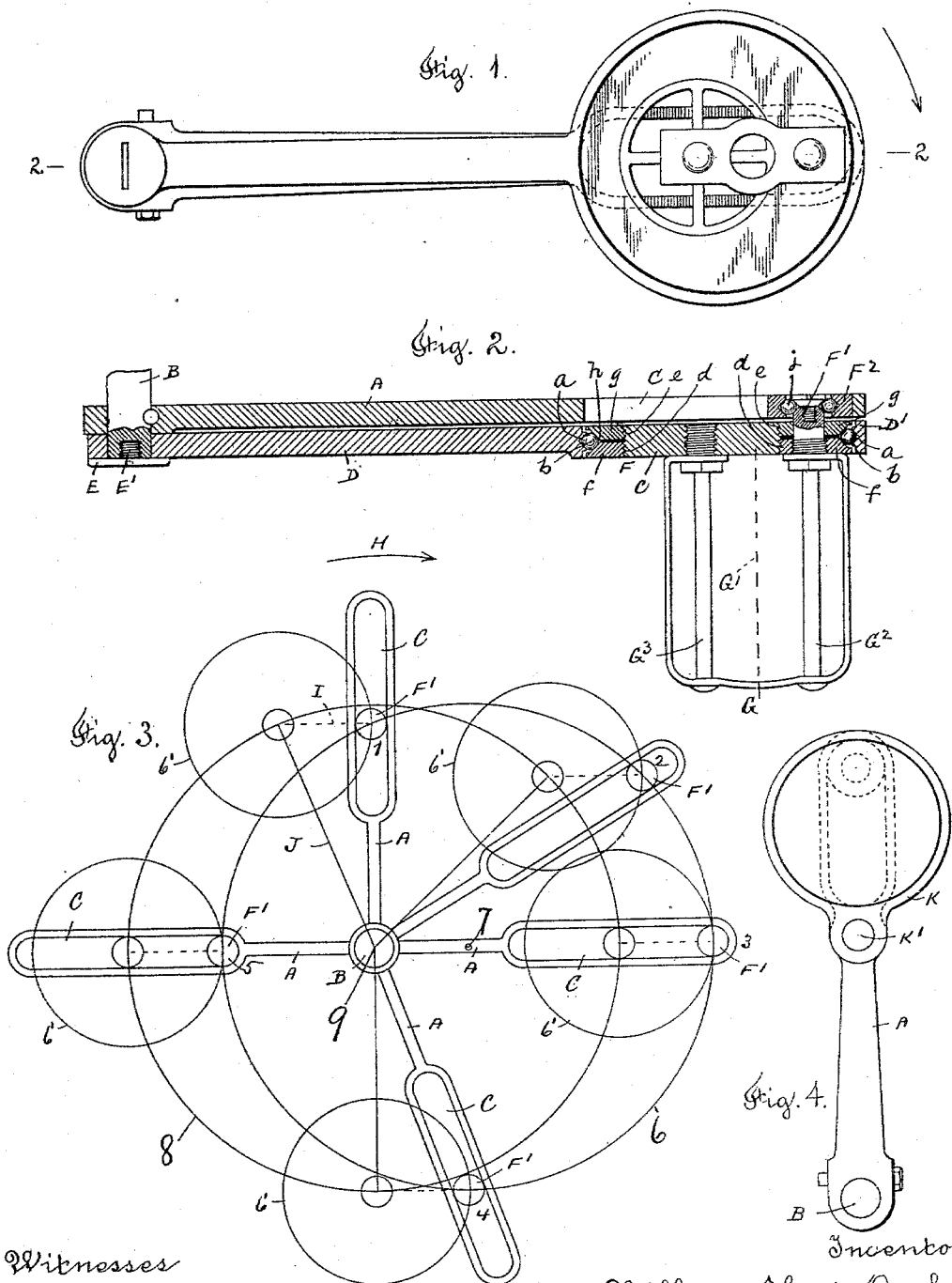
Witnesses
A. L. Whiting
Emma Keeter
Inventor
William Lloyd Decker
By his Attorney
Rufus B. Fowler

UNITED STATES PATENT OFFICE.

WILLIAM LLOYD DECKER, OF WORCESTER, MASSACHUSETTS.

CRANK AND PEDAL.

SPECIFICATION forming part of Letters Patent No. 571,753, dated November 24, 1896.

Application filed April 17, 1895. Serial No. 546,164. (No model.)

*To all whom it may concern:*

Be it known that I, WILLIAM LLOYD DECKER, a citizen of the United States, residing at Worcester, in the county of Worcester and State of Massachusetts, have invented a certain new and useful Improvement in Cranks and Pedals, of which the following is a specification, accompanied by drawings forming a part of the same, in which—

Figure 1 is a side view of a crank and pedal embodying my invention. Fig. 2 is a central sectional view on line 2 2, Fig. 1. Fig. 3 is a diagram showing the position of the pedal relative to the crank at different points in the rotation of the crank; and Fig. 4 is a side elevation of a crank and pedal with the arm carrying the pedal pivoted upon the crank-arm at a point between the end of the crank and the crank-shaft instead of being pivoted upon the crank-shaft, as shown in Figs. 1 and 2.

Similar letters refer to similar parts in the different figures.

My present invention relates particularly to the cranks and pedals employed in propelling velocipedes or cycles by foot-power; and it has for its object to provide means by which the power will be applied to the crank at varying radial distances during the revolution of the crank, whereby I am enabled to increase the power applied to the machine by increasing the leverage of the crank during its downstroke and correspondingly shortening the leverage of the crank during its upstroke, and at the same time cause the pedal to move in a circular path concentric with a point which is eccentric to the axis of the crank-shaft and having a radius intermediate between the longer and shorter radii at which the power is applied to the crank; and a further object of my invention is to provide means by which the application of the power to the crank may be reversed, that is, increased during the upstroke and decreased during its downstroke at the will of the operator, enabling an increased pressure to be applied upon the ascending crank when the cycle is moving upon a descending grade, as in the operation of back-pedaling, and I attain these objects by means of the mechanism represented in the accompanying drawings and hereinafter described.

A denotes a crank-arm keyed or otherwise attached to a crank-shaft B and provided in its free end with a radial slot C.

D denotes a pedal-arm pivoted upon the end of the crank-shaft B and held in place by any known means, in the present instance by the overhanging head E of a screw E', held in the end of the crank-shaft. The pedal-arm terminates at its free end in a circular strap D', inclosing a rotating crank-plate F, journaled in the strap D' and provided with a crank-stud F', which projects from the side of the crank-plate F next the crank A, and carries upon its end a roll $F^2$, inclosed in the radial slot C of the crank.

Projecting from the side of the crank-plate F opposite the crank A is the pedal G, having its axis, which is indicated by the broken line G', eccentric to the crank-plate F and being attached to the crank-plate at two points by the screw-threaded studs $G^2$ and $G^3$, so that when the pressure of the foot is applied to the pedal G it will be held in a horizontal plane and the crank-plate F will be turned one complete revolution relatively to the crank at each rotation of the crank, causing the sliding roll $F^2$ to be moved from one end of the slot C to its opposite end during half a revolution of the crank and to be moved back during the remaining half of its revolution.

In the diagram shown in Fig. 3 I have represented the relative positions of the crank-stud F' in the slot C when the crank-arm A and crank-shaft B are rotated in the direction of the arrow H. When the crank-arm is in a vertical position, or upon its upper dead-center, the crank-stud F' will occupy a position about midway the slot C, as indicated at 1, the broken line I indicating the horizontal position of the pedal and the line J indicating the axis of the pedal-arm, which in this position forms an angle with the axis of the crank-arm A. As the crank-arm moves in the direction of the arrow H the crank-stud moves toward the end of the slot C in the crank-arm, assuming at one-eighth of a revolution the position 2 and at one-quarter of a revolution and midway its downstroke the position 3 at the outer end of the slot C, and the axis of the pedal-arm and crank-arm are then both brought into the same horizontal plane.

The continued downward motion of the crank-arm toward the lower dead-center will bring the crank-stud into the position 4, and at the center of its upstroke the crank-stud F' will assume the position 5 at the inner end of the slot C.

The radial distance of the crank-stud F' from the center of the crank-shaft at the middle of the downstroke is as much greater than its radial distance at the middle of the upstroke as the entire "throw" of the crank-stud. If the center of the crank-stud F' be located one inch from the center of the crank-plate F, the entire throw of the crank will be two inches and the radial distance at which the power will be applied to the crank at the middle of its downstroke will be two inches greater than at the middle of its upstroke, thereby making the crank practically two inches longer at the middle of its downstroke than at the middle of its upstroke.

In the diagram represented by Fig. 3 the circle 6 represents the path of the crank-stud during the entire rotation of the crank, said circle being concentric with the point 7, located in front of the axis of the crank-shaft a distance equal to the eccentricity of the crank-stud F', and 8 denotes the circle which passes through the center of the crank-stud F' and is concentric with the center 9 of the rotating crank-plate F.

In Figs. 1 and 2 the pedal-arm is pivoted concentrically with the crank-shaft, and in Fig. 4 I have shown a slight modification by pivoting the pedal-arm K at a point K' to the crank-arm and intermediate between the crank-shaft and the free end of the crank-arm, thereby shortening the pedal-arm relatively to the length of the crank-arm; but the operation of the device will be the same, except that the angle between the pedal and crank-arms will be greater at the dead-centers of the crank.

In the accompanying drawings I have shown the device as applied to a crank for the purpose of increasing the leverage of the crank upon its downstroke and decreasing it upon its upstroke; but it will be obvious that in case the crank were turned a complete revolution with the strap D' independently of the rotation of the crank, thereby bringing the under side of the pedal G, as shown in the drawings, uppermost, then the movement of the crank-stud F' in the slot C would be reversed, that is, the stud F' would be at the outer end of the slot C midway the upstroke of the crank and at the inner end of the slot C midway its downstroke.

The strap D' is provided with an internal groove $a$, forming a track for a series of balls $b$, and the crank-plate F consists of a central ring $c$, provided on its periphery with the right and left hand screw-threads $d$ and $e$, and the outer rings $f$ and $g$, screwed thereon and inclosing a V-shaped track $h$ for the friction-balls $b$. The screw-threaded stud $G^2$ is held in the central ring $c$, and the screw-threaded stud $G^3$ is held in the ring $f$ and passes through the ring $g$, holding the rings $f$ and $g$ from independent rotation and allowing the rings $f$ and $g$ to be brought together by the rotation of the central ring $c$, thereby affording means for the adjustment of the V-shaped track $h$. I do not, however, confine myself to the specific construction as shown and described by which the adjustment of the track $h$ is secured; neither do I confine myself to any particular form of construction of the pedal G. The roll $F^2$, carried upon the crank-stud F, is preferably provided with a series of friction-balls $j$, interposed between it and the crank-stud, and, if desired, a series of friction-balls can be interposed between the crank-shaft B and the pedal-arm D. Such details of construction, however, form no part of my present invention.

What I claim as my invention, and desire to secure by Letters Patent, is—

The combination with a crank-shaft, and a crank-arm attached thereto and having a radial slot in its free end, of a pedal-arm pivoted at one end, a crank-plate journaled in the free end of said pedal-arm, a crank-stud projecting from said crank-plate and entering the slot in said crank-arm and a pedal carried by said crank-plate, substantially as described.

In testimony that I claim the foregoing as my invention I have signed my name, in presence of two witnesses, this 10th day of April, 1895.

WILLIAM LLOYD DECKER.

Witnesses:
ADOLPHUS M. DECKER,
HENRY E. BUCK.